Nov. 5, 1940.    D. H. STOREY    2,220,358

FISHLINE FLOAT

Filed Nov. 25, 1938

Inventor
D. H. Storey

By
Attorneys

Patented Nov. 5, 1940

2,220,358

UNITED STATES PATENT OFFICE 2,220,358

FISHLINE FLOAT

Daniel H. Storey, Wausau, Wis.

Application November 25, 1938, Serial No. 242,208

1 Claim. (Cl. 43—49)

This invention appertains to fishing, and more particularly to a float or bobber for a fishing line.

One of the primary objects of my invention is to provide a float or bobber which can be readily secured to a line intermediate the ends of the line without necessitating the cutting of the line or the making of objectionable knots therein, or requiring any dismanting, removing, or disengaging lures or hooks, sinkers, leaders, or other things with which the line may be equipped, to attach or detach the float or bobber.

Another salient object of my invention is to provide novel means for constructing the float or bobber whereby danger of the float slipping on the line is eliminated, and whereby a direct pull can be had from one end thereof to the other.

With these and other objects in view, the invention consists in the novel construction, arrangement, and formation of parts, as will be hereinafter more specifically described, claimed, and illustrated in the accompanying drawing, in which drawing:

Figure 1:
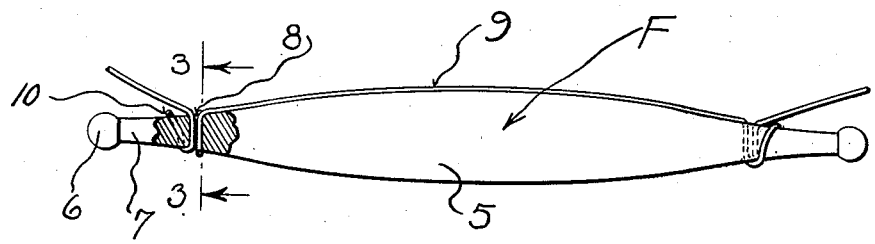
Figure 1 is a side elevational view of my improved float, illustrating the novel method of securing the same to a fishing line, parts of the float being shown broken away and in section.
Figure 2:
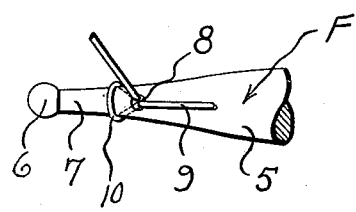
Figure 2 is a fragmentary plan view of the float, showing the method of attaching the line to one end thereof.
Figure 3:
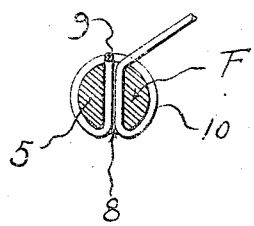
Figure 3 is an enlarged, transverse, sectional view through the float, taken on the line 3—3 of Figure 1, looking in the direction of the arrows.
Figure 4:
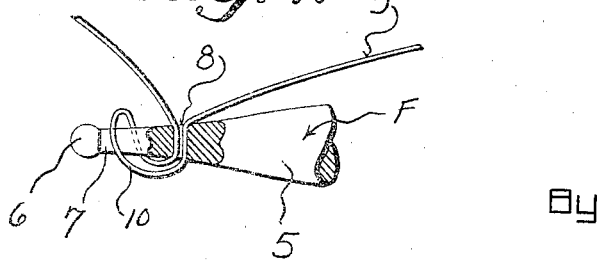
Figure 4 is a detail, fragmentary, side, elevational view of one end of the float, showing the means for initially connecting the line to the float.

Referring to the drawing in detail, wherein similar reference characters designate corresponding parts throughout the several views, the letter F generally indicates my float, which comprises an elongated body 5. This body 5 has its central portion enlarged and gradually tapers toward its opposite ends. The opposite ends of the float have formed thereon heads or knobs 6, and these heads or knobs are connected to the body 5 by thin neck portions or shanks 7. Adjacent the opposite ends of the body 5 of the float, the same is provided with diametrically extending openings 8 for the reception of the fishing line 9.

In applying the float to the line, the float is placed longitudinally of the line, and the line adjacent the opposite ends of the float is folded upon itself to form loops 10. These loops 10 are then threaded through the openings 8 in the float, after which the loops are placed over the heads 6 of the float and around the narrow connecting neck portions 7. The line is now drawn taut by pulling on the line in opposite directions on each side of the float. This will draw the loops 10 into tight engagement with the ends of the float, and displacement of the loops from the float is prevented by the heads or knobs 6.

By this arrangement, slipping of the float on the fishing line is prevented, and a direct pull can be had on the line from one end thereof to the other. The necessity of knotting or cutting the line to connect the float thereto is entirely eliminated. Likewise, the removing or disengaging of lures, hooks, sinkers, leaders, or other things with which the line may be equipped, is unnecessary to attach or detach the float or bobber.

Obviously, the float can be made in different sizes and shapes to suit varying conditions, and the heads 6 can be eliminated without danger of the line slipping.

Changes in details may be made without departing from the spirit or the scope of my invention, but what I claim as new is:

A float or bobber for fishlines comprising, an elongated body gradually tapering toward its opposite ends, rounded knobs at the opposite ends of the body, and thin necks connecting the rounded knobs with the body, said body adjacent the necks and in spaced relation to the knobs being provided with diametrically extending openings, the body being formed smooth throughout, and a fishline extending longitudinally of the float having portions thereof doubled to provide loops, with the loops threaded through the openings and placed over the knobs around said necks.

DANIEL H. STOREY.